J. F. O'CONNOR.
SHOCK ABSORBING MECHANISM.
APPLICATION FILED AUG. 20, 1917.
1,293,174.
Patented Feb. 4, 1919.
2 SHEETS—SHEET 2.
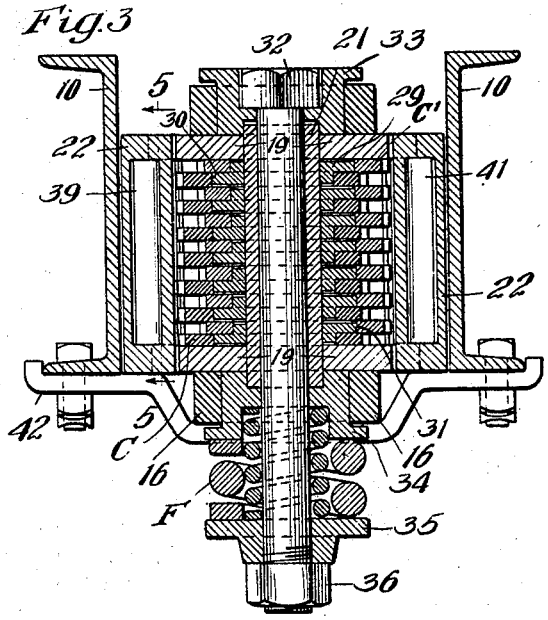
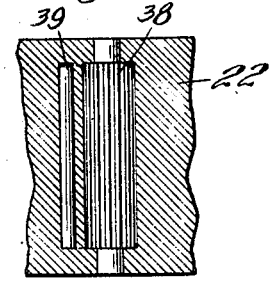
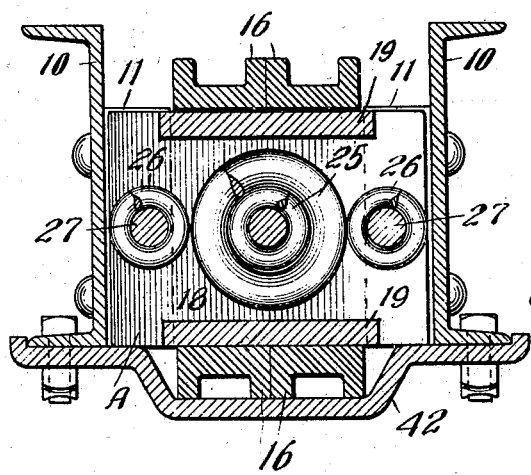
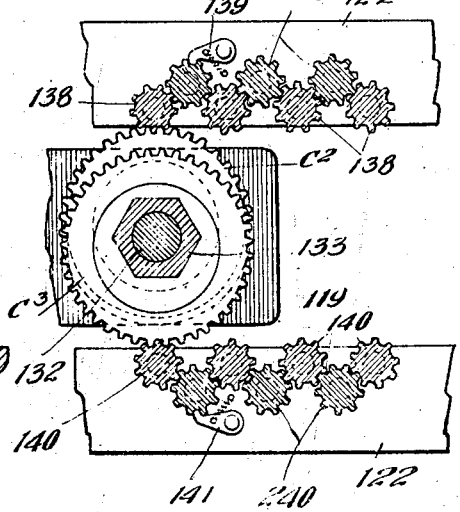
WITNESSES:
Wm. Geiger
INVENTOR.
John F. O'Connor
BY Geo. I. Haight
ATTORNEY

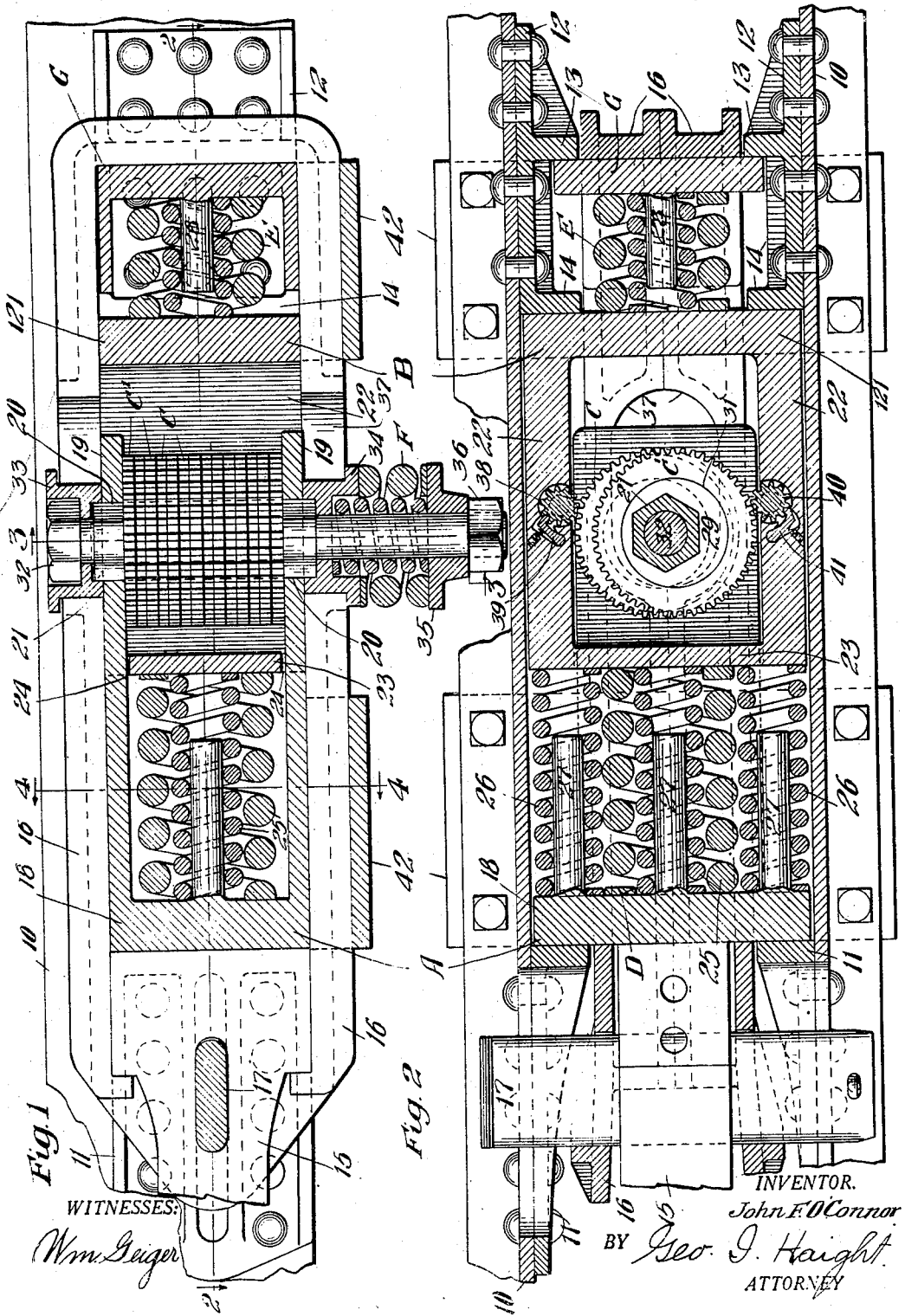

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBING MECHANISM.

1,293,174.     Specification of Letters Patent.     Patented Feb. 4, 1919.

Application filed August 20, 1917. Serial No. 187,295.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbing Mechanism, of which the following is a full, clear, concise, and exact description, reference being had to the accompanying drawings, forming a part of this specification.

This invention relates to improvements in shock absorbing mechanism.

The object of the invention is to provide a shock absorbing mechanism more particularly adapted for railway draft riggings and wherein a friction device is employed, the friction device having constant resistance during its actuation in the compression stroke and of substantially zero resistance during the release stroke.

More specific objects of the invention are to provide a shock absorbing mechanism of the character above indicated wherein a large frictional wearing area is obtained, high capacity and certain release.

In the drawing forming a part of this specification, Figure 1 is a part vertical, longitudinal section, part side elevation of a railway draft rigging showing my improvements in connection therewith. Fig. 2 is a horizontal, sectional view, taken on the line 2—2 of Fig. 1. Figs. 3 and 4 are vertical, transverse, sectional views, taken on the lines 3—3 and 4—4 of Fig. 1. Fig. 5 is a detail sectional view, taken on the line 5—5 of Fig. 3. And Fig. 6 is a sectional view illustrating my improvements as adapted for recoil shock absorbing mechanism for ordnance.

In said drawings and referring to the construction illustrated in Figs. 1 to 5, 10 denotes channel-shaped center sills of a car, to the inner faces of which are secured front stop lugs 11—11 and rear stop castings 12—12, the latter being each provided with a pair of stops 13 and 14 for the purpose hereinafter described.

The improved shock absorbing mechanism, as shown, comprises a pair of followers A and B; two sets of friction disks C and C'; a main spring resistance D; a preliminary spring E; a tension spring F for the friction disks; and an auxiliary follower G. The shock absorbing mechanism is operatively connected to the draw bar 15 by any suitable means, such as the two-part yoke 16—16, which is keyed to the draw bar as by coupler key 17.

The follower A comprises a follower portion proper 18 which engages the front stops 11—11 and extended rearwardly from the portion 18 are upper and lower parallel arms 19—19, each of the latter being provided with a hexagonal recess 20 to accommodate a hexagonal sleeve 21, the latter being hereinafter more particularly described.

The rear follower B is of substantially hollow box-like form having a rear follower portion proper 121, forwardly extended side arms 22—22 and a front cross-connecting piece 23, the latter being recessed, as indicated at 24—24 to accommodate the arms 19—19 of the front follower.

The main spring resistance D is interposed between the front wall 23 of the rear follower B and the follower A and, as shown, said spring resistance preferably comprises a central two-coil spring 25 and smaller side springs 26—26, all of said springs being seated on suitable posts 27 which are normally spaced from the front wall of the rear follower and are adapted to limit the relative approach of the followers A and B to prevent over-compression of the spring, in a well known manner.

Interposed between the auxiliary follower G and the follower B is the preliminary spring E which operates under draft only, said spring E being seated on a suitable post 28 which is adapted to limit the relative approach of the followers B and G.

The friction mechanism, as shown, includes two sets of friction disks C and C' as hereinafter described. The disks C are alternated with the disks C' and the set of disks C is mounted eccentrically with respect to the disks C'. This is preferably accomplished by employing a plurality of bushings 29—29, each of which is non-rotatably mounted on the thimble 21. Each bushing 29 has two circular portions 30 and 31 that are eccentrically disposed and form the bearings for the alternate sets of disks C and C'. The thickness of the bushings 29 is less than the thickness of two of the disks C and C' so that the latter may be forced into frictional engagement with each other in the manner hereinafter described. The sleeve 21 is non-rotatably held by the arms 19—19, as hereinbefore described and extending through said sleeve 21 is a vertical bolt 32, the head of which is seated in a circular casting 33 supported on the top of the arm 19. At its lower end, the bolt 32 is provided with a pair of spring followers 34 and 35 between which is interposed the tension spring F and the degree of tension therein may be varied by adjusting the nut 36. The two parts of the yoke 16—16 are provided with elongated recesses 37—37 to permit forward movement of the yoke with respect to the casting 33 and follower 34, as will be apparent from an inspection of Figs. 1 and 2.

Each of the disks C is provided with teeth around its periphery and all of said teeth are adapted to engage with a pinion 38 rotatably mounted in the adjacent side arm 22 of the follower B. Said pinion 38 is prevented from rotation in one direction by the spring-controlled elongated pawl 39. Similarly, the disks C' are provided with peripheral teeth that coöperate with another pinion 40 which is also prevented from rotation in one direction by a spring-controlled pawl 41.

The gear proper is supported by any suitable means such as the pair of saddle plates 42—42.

The position of the parts represented on the drawing is that of full release or normal. Upon buffing movement, the draw bar forces the follower A inwardly thereby compressing the main spring resistance D and at the same time shifting the friction disks bodily as a unit. As the friction disks move rearwardly, it is apparent that the pinion 38 will be prevented from rotation in a counter-clockwise direction and the pinion 40 from rotation in a clockwise direction. Consequently, said pinions 38 and 40 will coöperate at a rack with the teeth on the sets of disks C and C'. This will force the disks C and C' to rotate, the disks C in a counter-clockwise direction and the disks C' in a clockwise direction. Due to the eccentric mounting of the disks C and C' it is apparent that the engaging surfaces therebetween will be constantly changed thus minimizing wear and prolonging the life of the shock absorbing mechanism. It will also be noted that the frictional resistance of the disks C and C' remain constant during the compression stroke. During release, the spring resistance D will force the followers A and B apart and as the disks C and C' return to normal position, they will cause rotation of the pinions 38 and 40, the former in a clockwise direction and the latter in a counter-clockwise direction so that there is, for all practical considerations, no frictional resistance during the release stroke. In this manner, it is possible to obtain a very high capacity frictional resistance during compression stroke with certain release and the degree of friction between the plates may be varied as above described by adjusting the nut 36.

In draft, forward movement of the yoke 16—16 compresses the spring E until the post 28 engages the follower B and thereafter the follower B is moved forwardly compressing the spring resistance D and actuating the friction mechanism. In actuating the friction mechanism under draft, the disks themselves remain stationary, considered as a unit, and the pinions 38 and 40 move forwardly and function as a rack. During release, the pinions 38 and 40 will be free to rotate, as will be apparent from an inspection of the drawing.

In the construction illustrated in Fig. 6, two sets of eccentrically disposed friction disks $C^2$ and $C^3$ are employed, the same as in the other construction, said disks being held in frictional engagement by a spring resistance operated through the bolt 132, the bolt 132 and the sleeve 133 being carried by a pair of arms, one of which is shown and designated as 119. The arms 119 may form a part of or be rigidly attached to the barrel of a gun or other ordnance the recoil of which must be absorbed by suitable shock absorbing mechanism. The disks $C^2$ and $C^3$ are provided with peripherial teeth as in the other construction and are adapted to coöperate with a series of rotatable pinions 138—138 on one side and pinions 140—140 on the opposite side, said pinions 138 and 140 being mounted in any suitable framework, as roughly indicated at 122. The pinions 138 and 140 are spaced apart a distance a multiple of the pitch of the teeth thereof and the teeth on the disks $C^2$ and $C^3$ must never be out of engagement with some one of the pinions 138 and 140. Interposed between the pinions 138 is a series of other pinions 238 and between the pinions 140 a series of pinions 240 whereby movement of one pinion is communicated to all the others of the same series. One of the pinions 238 and one of the pinions 240 is prevented from rotation in one direction by spring-controlled pawls 139 and 141.

With the arrangement shown in Fig. 6 the action is similar to that hereinbefore described for the structures shown in the other figures, except that the travel of the friction disks may be made as great as desired by merely duplicating the pinions 138 and 140. In the drawing I have shown four pinions 138 and four pinions 140, but it is obvious that the number may be increased or decreased to suit conditions. It is obvious that during the return stroke the frictional resistance will be substantially *nil*.

Although I have herein shown and described what I now consider the preferred manner of carrying out my invention, the same is merely illustrative and I contemplate all changes and modifications that come within the scope of the claims appended hereto.

I claim:

1. In shock absorbing mechanism, the combination with a spring resistance; of a friction resistance comprising a plurality of coöperative elements relatively movable during the compression of the spring resistance, said friction resistance being of uniform capacity during its entire stroke of compression, said elements remaining relatively stationary during release and thereby rendering the friction resistance of substantially zero capacity during the release stroke.

2. In shock absorbing mechanism, the combination with a spring resistance; of a friction resistance operative during the compression of the spring resistance, said friction resistance being of uniform capacity during its entire stroke of compression and of substantially zero capacity during the release stroke, said friction resistance including a plurality of friction plates under pressure and relatively movable during the compression stroke and relatively immovable during the release stroke.

3. In shock absorbing mechanism, the combination with a spring resistance; of a friction resistance operative during the compression of the spring resistance, said friction resistance being of uniform capacity during its entire stroke of compression and of substantially zero capacity during the release stroke, said friction resistance including a plurality of friction plates bodily movable as a unit and having relative movement therebetween.

4. In a shock absorbing mechanism, the combination with two relatively movable members; of a plurality of rotatable friction plates carried by one of said members; and means carried by the other of said members for engaging said plates to move the same relatively to each other when said members are moved toward each other, and spring means for forcing said members apart after having been moved toward each other.

5. In a shock absorbing mechanism, the combination with two relatively movable members; of a plurality of friction plates carried by one of said members; spring means interposed between said members; and means carried by the other of said members and coöperable with said plates to move the latter relatively to each other when said members are moved toward each other, the friction plates remaining relatively stationary during the separating movement of said members.

6. In shock absorbing mechanism, the combination with a pair of followers and stops coöperative therewith; of spring means interposed between said followers; and friction mechanism including a set of friction plates carried by and bodily movable with one of said followers; and means carried by the other of said followers for moving said plates relatively to each other when said followers approach each other.

7. In shock absorbing mechanism, the combination with a pair of followers and stops coöperative therewith; of spring means interposed between said followers; and friction mechanism including a set of friction plates carried by and bodily movable with one of said followers; and means carried by the other of said followers for moving said plates relatively to each other when said followers approach each other, said means including gear teeth formed on the plates and pawl acting pinions coöperative therewith.

8. In a shock absorbing mechanism, the combination with a pair of followers and a spring interposed therebetween; of two sets of eccentrically mounted friction disks mounted on one of said followers and bodily movable therewith as a unit; and pawl acting means carried by the other of said followers and coöperable with said disks to rotate the latter relatively to each other when the followers are forced toward each other.

9. In shock absorbing mechanism the combination with a pair of followers relatively movable and having a spring resistance interposed therebetween; of two sets of eccentrically disposed rotatable friction disks mounted on one of said followers and movable bodily as a unit therewith, said disks having gear teeth around their peripheries; and pawl controlled pinions carried by the other of said followers to coöperate with the teeth on said disks to rotate the latter relatively to each other when the followers are forced toward each other.

In witness that I claim the foregoing I have hereunto subscribed my name this 4th day of Aug. 1917.

JOHN F. O'CONNOR.